United States Patent

[11] 3,583,109

[72] Inventors William P. Flohr, Jr.
 Waynesboro;
 Scott L. Pryor, Blue Ridge Summit, both of, Pa.
[21] Appl. No. 810,605
[22] Filed Mar. 26, 1969
[45] Patented June 8, 1971
[73] Assignee Litton Industries, Inc.
 Beverly Hills, Calif.

[54] MECHANISMS FOR PRECISION LOCATION OF A CRANKSHAFT IN AN AUTOMATIC CRANKPIN GRINDING MACHINE
 14 Claims, 6 Drawing Figs.
[52] U.S. Cl. ................................................. 51/237
[51] Int. Cl. ............................................. B25b 41/06
[50] Field of Search .......................................... 51/237

[56] References Cited
 UNITED STATES PATENTS
 2,772,527 12/1956 Farnam .................... 51/237
 3,427,760 2/1969 Happel ........................ 51/237
 2,940,227 6/1960 Flohr ........................... 51/237

Primary Examiner—Harold D. Whitehead
Attorney—Diller, Brown, Ramik & Holt

ABSTRACT: This disclosure is directed to means for effecting the precise rotary location of a crankshaft in an automatic crankpin grinding machine wherein the locating function is dependent upon holes, notches or similar recesses in a flange of the crankshaft. The means for effecting the rotary location of the crankshaft is a fixed locating pin which extends axially from an index plate and enters a locating hole of the crankshaft flange. A torsion spring is fixed at one end to the index plate and carries another pin at its opposite end for entering another hole of the crankshaft flange whereupon a turning force or moment is applied to the crankshaft to rotate the same and urge and/or maintain a surface of the locating hole in firm engagement with the locating pin.

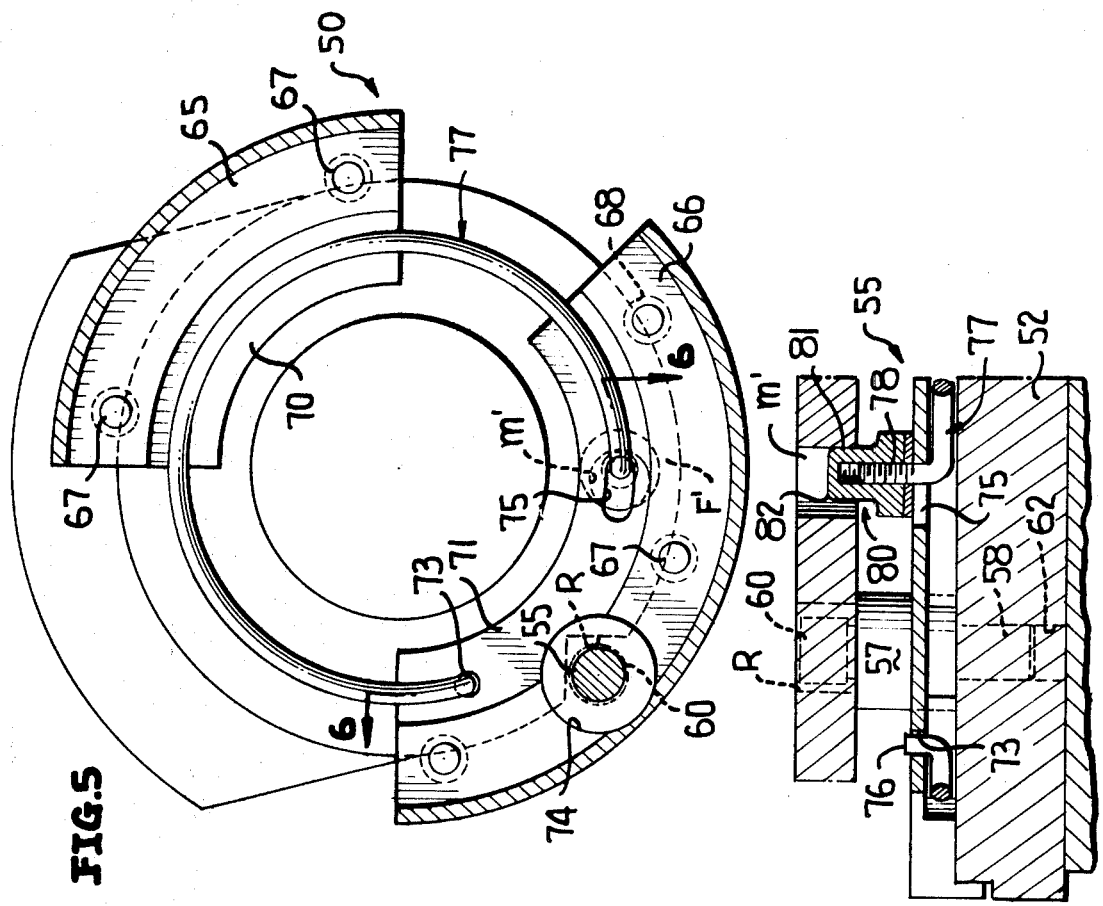
FIG.5
FIG.6
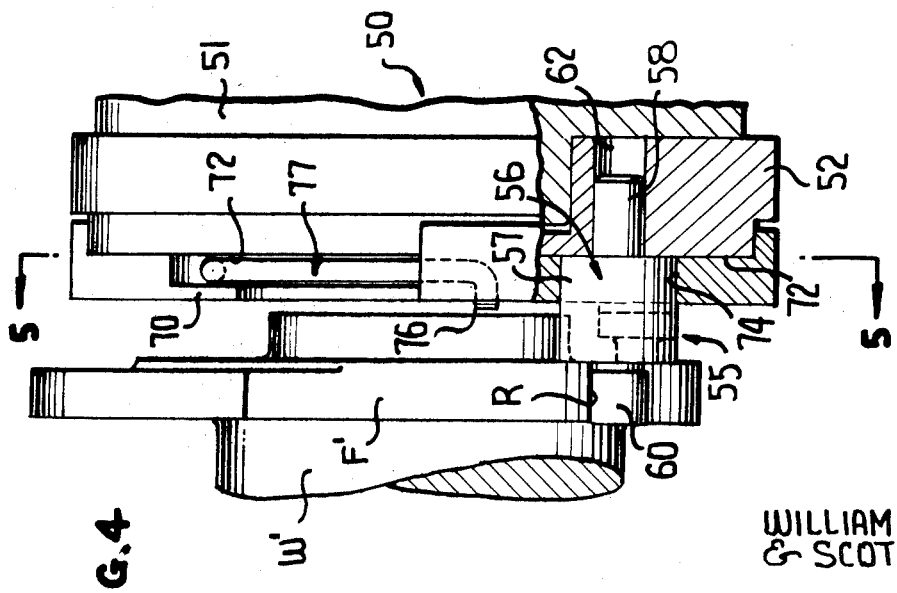
FIG.4
INVENTORS
WILLIAM P. FLOHR, Jr.
& SCOTT L. PRYOR
ATTORNEYS

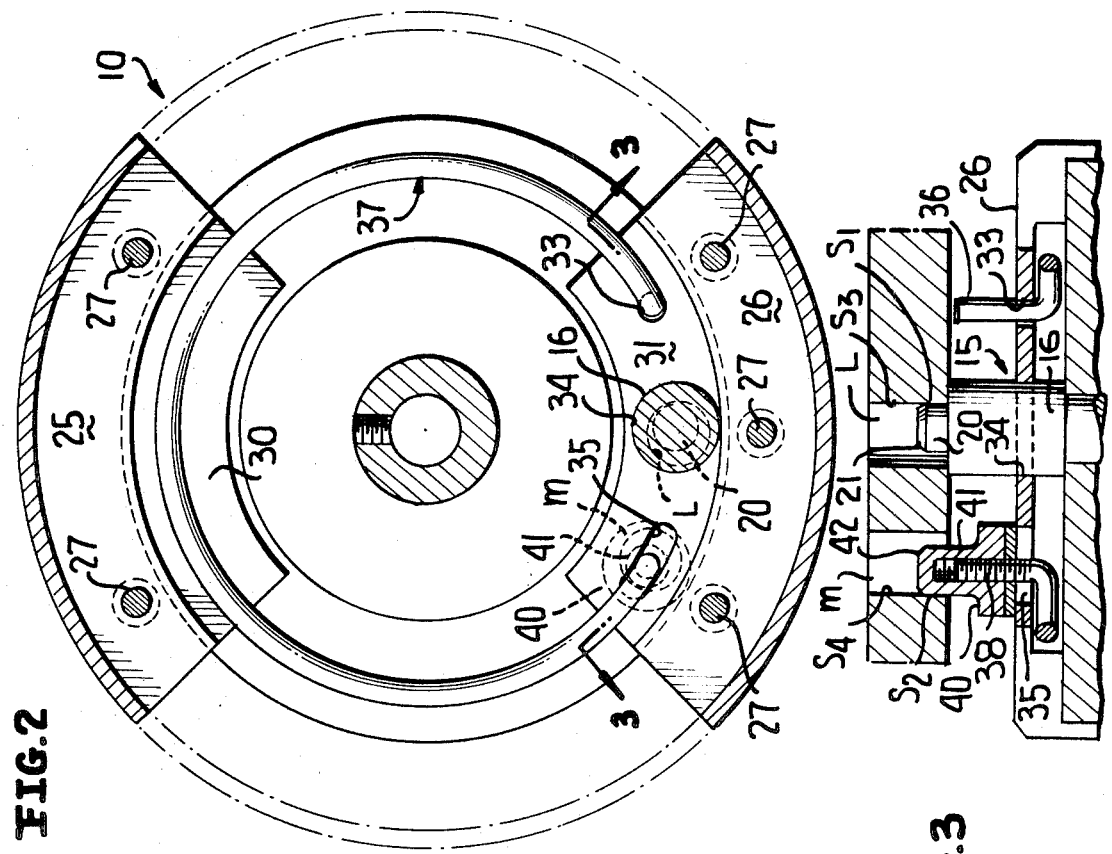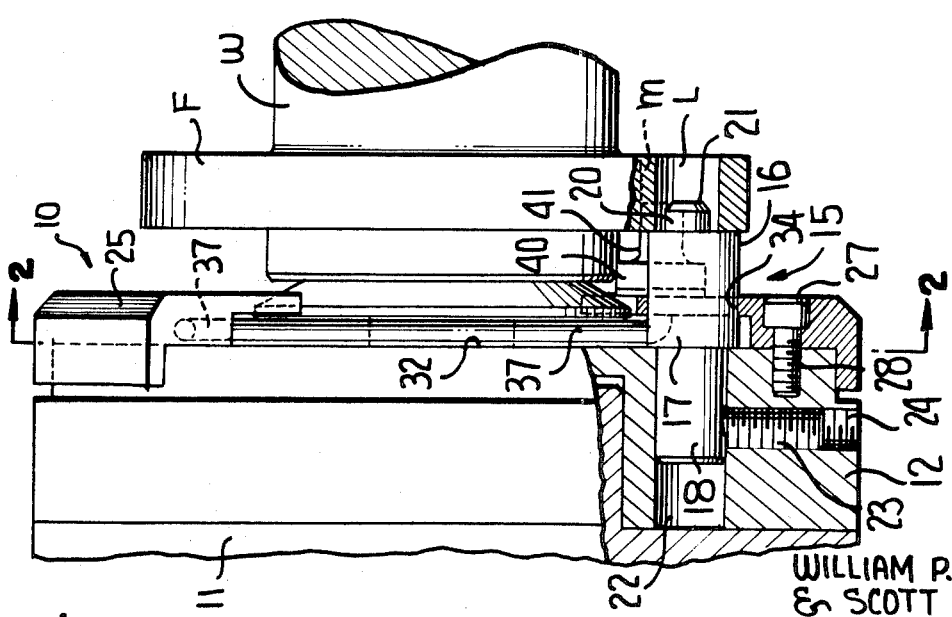

MECHANISMS FOR PRECISION LOCATION OF A CRANKSHAFT IN AN AUTOMATIC CRANKPIN GRINDING MACHINE

During the grinding of crankpins of crankshafts, particularly in automatic crankpin grinding machines, it is necessary that each crankpin be accurately positioned in axial alignment with the work drive spindle. Conventional automatic rotary indexing mechanisms provide a relatively reasonable accurate rotary index from one crankpin to another, but they do not necessarily provide firm contact between the rotary locating means and the work-locating surface of the crankshaft. In the past this has been accomplished by applying a turning force directly to the crankpins by a preliminary advance movement of a workrest shoe or by yielding means for applying the locating force against the crankpin. Such devices are effective to perform rotary indexing functions, but they are expensive, complex and the precision thereof is not completely satisfactory.

The present invention is directed to the precise rotary location of a crankshaft in which the locating surface of the crankshaft is a locating hole, notch or similar recess in the crankshaft flange, and reference hereafter to a locating "hole" is intended to include a "notch," a "recess," or other like relieved areas and equivalents thereof. The locating mechanism of this invention consists of an axially extending locating pin carried by an index plate which enters the locating hole. Another pin, which for purposes of description will be termed a "moment" pin, is also carried by the index plate for entering a "moment" hole, notch or similar recess in the crankshaft flange. The moment pin is carried by a torsion spring whereby upon the entry of both pins in their associated holes the force of the torsion spring applies a turning force or moment to the crankshaft through the contact between the moment pin and the moment hole which turns the crankshaft to accurately align the crankpin axis relative to the spindle axis in the course of which firm engagement is effected between the locating surface of the locating hole and the locating surface of the locating pin. In this manner the force applied to effect this precise locating function is very slight, and since it is applied directly to the crankshaft flange, it does not tend to deflect the crankshaft as is true where the locating force is applied directly to a crankpin thereof. Moreover, the locating mechanism is self-limiting in that excessive rotation of the crankshaft is precluded and is automatically stopped upon the firm engagement of the locating hole surface against the fixed locating pin. Finally, this precise locating function occurs only when the crankshaft is placed in the machine, and it eliminates the necessity of performing a precision rotary locating operation of the crankshaft each time a new crankpin is indexed into alignment with the driving spindle.

It is therefore, a primary object of the present invention to provide a novel locating mechanism for effecting precise rotary location of a crankshaft in an automatic crankpin grinding machine wherein the crankshaft includes a flange having locating and moment holes, the mechanism including an index plate carrying a locating pin for entering the locating hole of the crankshaft flange, a moment pin for entering the moment hole of the crankshaft, and biasing means coupled between the moment pin and the index plate for imparting a turning moment to the crankshaft through the coacting surfaces of the moment pin and the moment hole when angular misalignment is present between the crankpins and spindle to impart slight rotary movement to the crankshaft and precisely locate the same by virtue of firm contact between the locating pin and a surface of the locating hole.

A further object of this invention is the provision of a novel mechanism of the type aforesaid wherein the biasing means is a torsion spring connected at one end to the index plate and carrying the moment pin at an opposite end thereof.

A further object of this invention is to provide a novel locating mechanism of the type heretofore described wherein an offset portion of the torsion spring is received in a slot of a plate secured to the index plate to limit relative movement between the pins and assure the entry thereof in their associated holes.

With the above and other objects in view that will hereinafter appear, the nature of the invention will be more clearly understood by reference to the following detailed description, the appended claimed subject matter, and the several views illustrated in the accompanying drawings.

In The Drawings:

FIG. 1 is a fragmentary side elevational view of a portion of an automatic crankpin grinding machine, and illustrates an index plate carrying a locating mechanism having a pair of pins which are received within a pair of holes of a crankshaft flange.

FIG. 2 is a sectional view taken generally along line 2—2 of FIG. 1, and illustrates a torsion spring fixed at one end to the index plate and carrying a moment pin at its opposite end.

FIG. 3 is a sectional view taken generally along line 3—3 of FIG. 2, and illustrates the position of the moment and locating pins relative to moment and locating holes which is effective to align a crankpin with the work drive spindle.

FIG. 4 is a fragmentary side elevational view of a portion of another crankpin grinding machine, and illustrates an index plate carrying another locating mechanism having a pair of pins, at least one of which is received within a radially outwardly opening notch of a crankshaft flange.

FIG. 5 is a sectional view taken generally along line 5—5 of FIG. 4, and illustrates a torsion spring fixed at one end and carrying a moment pin at its opposite end.

FIG. 6 is a sectional view taken generally along line 6—6 of FIG. 5, and illustrates the position of the moment and locating pins relative to moment and locating surfaces of the flange which are effective to align a crankpin with the work drive spindle.

A portion of an automatic crankpin grinding machine 10 is illustrated in FIG. 1 of the drawings, and includes a rotatable work drive spindle 11 which carries a conventional clamping fixture (not shown). The clamping fixture supports a workpiece W which in the illustrated embodiment of the invention includes a flange F provided with a locating hole or opening L and a moment hole or opening M, or similar equivalent means as, for example, notches or recesses (not shown).

A rotary index plate 12 is positioned in generally axial alignment with the crankshaft W and in eccentrically offset relation to the axis of rotation of the spindle 11 and the clamping fixture (not shown). The index plate 12 carries the novel locating mechanism of this invention which is generally designated by the reference numeral 15.

The locating mechanism 15 includes locating means in the form of a locating pin 16 having an enlarged midportion 17, a reduced end 18, and an opposite smaller end 20 having a chamfer 21. The end 18 is received in a bore 22 of the index plate 12, and is rigidly secured therein by means of a setscrew 23 threaded into a threaded bore 24 in the conventional manner fully illustrated in FIG. 1.

A pair of similar retaining plates 25, 26 are carried by the index plate 12 at generally diametrically opposite positions, and are removably secured thereto by bolts 27 threadably received in threaded bores 28, as shown in FIG. 1. Radially inwardly directed flanges 30, 31 of the respective retaining plates 25, 26 are spaced from a forwardmost face 32 of the index plate 12 (FIG. 1).

Referring specifically to FIGS. 2 and 3 of the drawings, the flange 31 of the retaining plate 26 is provided with an opening 33, a larger opening 34 and a slot 35. The opening 34 is provided simply to permit the projection of the locating pin 16 therethrough, as is best illustrated in FIGS. 1 and 3.

The opening 33 receives an axially directed offset portion 36 (FIG. 3) of biasing means in the form of a torsion spring 37 which at its opposite end portion includes another axially offset and threaded end 38 which projects through the slot 35. Moment or rotary force applying means in the form of a moment pin 40 is threadably secured to the threaded end 38 of the torsion spring 37 in the manner clearly illustrated in FIG.

3. The moment pin 40 likewise includes a reduced end 41 having a chamfer 42.

It is to be noted at this time that prior to the insertion of the ends 20, 41 of the pins 16, 40 into the respective holes L, M, remote peripheral surfaces S1, S2 of the respective ends 20, 41 are spaced from each other a distance greater than remote surfaces S3, S4 of the holes L, M, respectively. The spacing of the ends 20, 41 from each other is limited by the contact between the threaded offset end portion 38 with the left-hand side of the slot 35 as viewed in FIG. 3. In other words, prior to being introduced into the holes L, M, the pin 40 is to the left of the position shown in FIG. 3 and in this position the distance between the remote surfaces S3, S4 of the respective holes L, M.

When the crankshaft W is placed in the machine 10 the holes L, M are in approximate axial alignment and in approximate arcuate relationship to the ends 20, 41 of the respective pins 16, 40. Upon the movement of the crankshaft W either manually or automatically endwise toward the locating mechanism 15, the ends 20, 41 of the pins 16, 40 progressively enter the respective holes L, M with the chamfers 21, 42 assisting in the initial introduction of the pins into the holes. The end 20 of the pin 16 causes the flange F and the crankshaft W to turn in a counterclockwise direction as shown in FIG. 2, against the force exerted by the spring 37 through the pin 40. As the ends of the pins are introduced into the holes the chamfer 42 will guide the end 41 of the pin 40 into the hole M and the chamfer 21 will guide the end 20 of the pin 16 into the hole L. If the pins enter their respective holes, the biasing force of the spring 37 shifts the crankshaft W to hold the surface S1 in contact with the surface S3 to precisely locate the crankshaft. The continued biasing force of the spring 37 maintains contact between the surfaces S1, S3 and S2, S4 to maintain the precise alignment of each crankpin with the spindle 11 during the subsequent grinding of all crankpins thereof.

From the foregoing it should be noted that in order to provide the desired alignment between the axis of the work drive spindle 11 and each crankpin axis, the locating mechanism 15 requires two coacting locating elements, the more rigid locating pin 16 being fixed and representing the fixed axis of the work drive spindle adapted for engagement with the locating surface S3 of the hole L, while the other pin 40 must therefore be resiliently movable at it represents the axis of a crankpin which must be moved to align the axis of each crankpin and the work drive spindle axis. Thus, the more rigid locating element or pin 16 determines or establishes the locating point while the other pin 40 assures contact between the surfaces S1, S3 by exerting a force against the surface S4 of the hole M. By constructing the pins 16, 40 in this manner the less rigid pin 40 will move or deflect when the same enters the hole M, and thereafter the deflection will assure firm contact between the locating surface S3 of the hole L and the surface S1 of the more rigid end 20 of the pin 16.

A portion of another crankpin grinding machine 50 is illustrated in FIG. 4 of the drawings, and includes a rotatable work drive spindle 51 which carries a conventional clamping fixture (not shown). The clamping fixture supports a workpiece W' which in the illustrated embodiment of the invention includes a flange F' provided with a radially outwardly opening locating notch R or similar relieved area and a moment hole or opening M' or similar equivalent means.

A rotary index plate 52 is positioned in generally axial alignment with the crankshaft W' and in eccentrically offset relationship to the axis of rotation of the spindle 51 and the clamping fixture (not shown). The index plate 52 carries another locating mechanism of this invention which is generally designated by the reference numeral 55.

The locating mechanism 55 includes locating means in the form of a locating pin 56 having an enlarged midportion 57, a reduced end 58, and an opposite smaller end 60. The end 58 is received in a bore 62 of the index plate 52, and is radially secured therein by means of a setscrew (not shown) threaded into a threaded bore (also not shown) in the manner fully illustrated in FIG. 1 of the drawings relative to the locating pin 16.

A pair of similar retaining plates 65, 66 are carried by the index plate 52, and are removably secured thereto by bolts 67 threadably received in threaded bores 68 (FIG. 5). Radially inwardly directed flanges 70, 71 of the respective retaining plates 65, 66 are spaced from a forwardmost face 72 of the index plate 52, as best shown in FIG. 4.

Referring specifically to FIGS. 5 and 6 of the drawings, the flange 71 of the retaining plate 66 is provided with an opening 73, a larger opening 74, and a slot 75. The opening 74 is provided simply to permit the projection of the locating pin 56 therethrough, as is best illustrated in FIGS. 4 and 5.

The opening 73 receives an axially directed offset portion 76 (FIG. 6) of biasing means in the form of a torsion spring 77 which at its opposite end portion includes another axially offset and threaded end 78 (FIG. 6) which projects through the slot 75. Moment or rotary force-applying means in the form of a moment pin 80 is threadably secured to the threaded end 78 of the torsion spring 77 in the manner clearly illustrated in FIG. 6. The moment pin 80 includes a reduced end 81 having a chamfer 82.

The operation of the locating mechanism 55 is identical to that described heretofore relative to the locating mechanism 15 except, of course, that the locating pin 56 engages a locating surface S5 of the notch R, as opposed to a locating surface provided by a hole, as in the case of the locating mechanism 15. That is, upon the movement of the crankshaft W' either manually or automatically endwise toward the locating mechanism 55, the ends 60, 81 of the pins 56, 80 progressively engage the respective notch R and the hole M'. The end 60 of the pin 56 causes the flange F' and the crankshaft W' to turn in a counterclockwise direction, as viewed in FIG. 5, against the force exerted by the spring 77 through the pin 80 to precisely locate the crankshaft and maintain the precise alignment of each crankpin with the spindle 51 during the subsequent grinding of all crankpins thereof.

While preferred forms and arrangement of parts have been shown in illustrating the invention, it is to be clearly understood that various changes in details and arrangement of parts may be made without departing from the spirit and scope of this disclosure.

I claim:

1. A mechanism for the rotary location of a crankshaft in a machine tool having a work drive spindle by utilizing a locating surface on a flange of the crankshaft comprising an index plate carrying a locating pin for engaging said locating surface, means carried by said index plate for engaging another portion of the crankshaft, and a spring connecting said locating pin with said means carried by said index plate for applying a rotating force thereto relative to said index plate to effect and maintain contact between said locating surface and said locating pin.

2. The mechanism as defined in claim 1 wherein said locating pin and said engaging means are mounted for relative movement and are normally spaced from each other a distance greater than the distance between said locating surface and said another portion whereupon the engagement of said locating pin and said engaging means with said respective locating surface and said another portion imparts a turning movement to the crankshaft to effect precision alignment between the axes of the spindle and one of the crankshaft crankpins.

3. The mechanism as defined in claim 1 wherein said spring normally urges said locating pin and said engaging means away from each other to thereby apply the rotating force to the crankshaft.

4. The mechanism as defined in claim 1 wherein said engaging means is another pin.

5 The mechanism as defined in claim 1 wherein said engaging means is another pin mounted for relative movement with respect to said locating pin.

6. The mechanism as defined in claim 2 including means for maintaining said locating pin and said engaging means spaced a predetermined distance from each other corresponding generally to the distance between said locating surface and said another portion.

7. The mechanism as defined in claim 3 wherein said engaging means is another pin.

8. The mechanism as defined in claim 3 wherein said spring is a torsion spring.

9. The mechanism as defined in claim 3 wherein means are provided for limiting the relative movement of said locating pin and said engaging means away from each other.

10. The mechanism as defined in claim 3 wherein said spring is a torsion spring of a generally annular configuration having one end fixed to said index plate and an opposite end fixed to said engaging means.

11. The mechanism as defined in claim 10 wherein the end of said spring fixed to said engaging means passes through a slotted plated which is in turn fixed to said index plate.

12. The mechanism as defined in claim 11 wherein said engaging means is another pin.

13. A mechanism for the rotary location of a crankshaft in a machine tool having a work drive spindle by utilizing a locating surface on a flange of the crankshaft comprising an index plate carrying a locating pin for engaging said locating surface, means carried by said index plate for engaging another portion of the crankshaft, a spring connecting said locating pin with said means carried by said index plate for applying a rotating force thereto relative to said index plate to effect and maintain contact between said locating surface and said locating pin, and said locating surface being a radially outwardly opening notch formed in said crankshaft flange.

14. A mechanism for the rotary location of a crankshaft in a machine too having a work drive spindle by utilizing a locating surface on a flange of the crankshaft comprising an index plate carrying a locating pin for engaging said locating surface, means carried by said index plate for engaging another portion of the crankshaft, a spring connecting said locating pin with said means carried by said index plate for applying a rotating force thereto relative to said index plate to effect and maintain contact between said locating surface and said locating pin, and said locating surface being an axially opening hole formed in said crankshaft flange.